(12) United States Patent
Ginsberg et al.

(10) Patent No.: US 6,236,976 B1
(45) Date of Patent: *May 22, 2001

(54) SYSTEM AND PROCESS FOR JOB SCHEDULING USING LIMITED DISCREPANCY SEARCH

(75) Inventors: Matthew L. Ginsberg, Eugene, OR (US); William D. Harvey, Palo Alto, CA (US); James M. Crawford, Flower Mound, TX (US); Ari K. Jonsson, Palo Alto, CA (US); Joseph C. Pemberton, Fairfax, VA (US)

(73) Assignee: State of Oregon Acting by and Through the State Board of Higher Education on Behalf of the University of Oregon, Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/580,933

(22) Filed: May 25, 2000

Related U.S. Application Data

(63) Continuation of application No. 09/141,249, filed on Aug. 27, 1998, now Pat. No. 6,070,144, which is a continuation-in-part of application No. 08/584,197, filed on Jan. 9, 1996, now abandoned, which is a continuation-in-part of application No. 08/667,456, filed on Jun. 21, 1996, now abandoned.

(51) Int. Cl.$^7$ ................................................. G06F 17/60
(52) U.S. Cl. ................................. 705/8; 705/9; 709/102; 709/104; 706/41
(58) Field of Search ....................... 705/7, 8, 9; 709/102, 709/104; 706/46

(56) References Cited

U.S. PATENT DOCUMENTS

| 4,797,839 | 1/1989 | Powell . |
| 5,212,791 | 5/1993 | Damian et al. . |
| 5,353,229 | 10/1994 | Tanaka . |
| 5,381,332 | * 1/1995 | Wood ........................................ 705/8 |
| 5,440,675 | 8/1995 | Matsunaga et al. . |
| 5,574,640 | * 11/1996 | Sycara et al. .................... 364/468.05 |

OTHER PUBLICATIONS

Abdelzaher, T.F. et al; Optimal combined task and message scheduling in distributed real–time systems, Real–Time Systems Symposium, 1995. Proceedings., 16th IEEE, 1995.*

Basin and Walsh, "Difference Unification," Proceedings of the Thirteenth International Joint Conference on Artificial Intelligence, Chambery, France, Aug. 28–Sep. 3, 1993, 116–122.

Korf, R.E., "Depth–First Iterative–Deepening: An Optimal Admissible Tree Search," Artificial Intelligence 27:97–109 (1985).

Ginsberg and Harvey, "Iterative Broadening," Artificial Intelligence 55:367–383 (1992).

Selman, B. et al., "A New Method for Solving Hard Satisfiability Problems," Proceedings AAAI–92, 440–446 (1992).

Smith, B., "Using Heuristics for Constraint Satisfaction Problems in Scheduling," IEE Collq. No. 163, 1993.

Minton, S. et al., "Solving Large–Scale Constraint Satisfaction and Scheduling Problems Using a Heuristic Repair Method," Proceedings AAAI–90, 17–24.

* cited by examiner

Primary Examiner—Vincent Millin
Assistant Examiner—Jagdish N Patel
(74) Attorney, Agent, or Firm—Fenwick & West LLP

(57) ABSTRACT

Assignment of attributes to elements subject to constraints is achieved using a system that has a systematic engine and a nonsystematic engine. The systematic engine includes a schedule developer for producing partial proposed assignments, a pruning processor for determining violations of discrepancy limits by a partial proposed assignment, and a bound selector for relaxing discrepancy limits as needed. The non-systematic engine includes a schedule packer for modifying assignments proposed by the systematic engine and an evaluator for comparing the modified assignments with the constraints.

10 Claims, 3 Drawing Sheets

SYSTEM AND PROCESS FOR JOB SCHEDULING USING LIMITED DISCREPANCY SEARCH

CROSS-REFERENCES TO RELATED APPLICATIONS

This application is a continuation of U.S. patent application Ser. No. 09/141,249, filed Aug. 27, 1998, now U.S. Pat. No. 6,070,144, which is a continuation in part of U.S. patent application Ser. No. 08/584,197, filed Jan. 9, 1996, now abandoned, and a continuation in part of U.S. patent application Ser. No. 08/667,456, filed Jun. 21, 1996, now abandoned.

STATEMENT AS TO RIGHTS TO INVENTIONS MADE UNDER FEDERALLY SPONSORED RESEARCH AND DEVELOPMENT

The present invention is a subject invention under Air Force Office of Scientific Research grant no. 92-0693, and ARPA/Rome Labs contracts F30602-91-C-0036 and F30602-93-C-00031, and as such the United States Government has rights therein.

BACKGROUND OF THE INVENTION

1. Field of the Invention

The present invention relates generally to systems and processes for scheduling complex jobs, and specifically to a scheduling system and process using limited discrepancy search techniques.

2. Description of Related Art

A class of problems known as "Constraint-Satisfaction Problems" (CSPs) arises often in diverse areas such as human resource allocation, artificial vision, event planning, map coloring, and the like. These problems are characterized in having a set of elements and a set of possible attributes, and in calling for a particular assignment of attributes to elements. An example of a CSP might be the problem of how to staff the night shift of a factory with at least one person who is intelligent and at least one person who is strong. Another, slightly more general, example is scheduling the jobs required, using finite available resources, to construct a prototype of a new product by a target date.

Processes using artificial intelligence (AI) techniques have been applied to CSPs not only to permit managers to allocate human and other resources in a feasible manner, but in a wide range of other diverse situations, for instance to help planners determine feasible schedules for meetings, to assist scientists in interpreting images from artificial vision devices, and even to allow cartographers to select colors for countries or other municipal areas when designing maps.

Two primary approaches have been taken in attempting to deal with such situations using artificial intelligence. The first is known as "systematic" because under this approach, every possible set of element-attribute pairings is eventually considered, unless a set of pairings that meets all of the constraints is found at some point in the process. These processes often rely on maintaining a database of possible reasons why certain assignments, or groups of assignments, will not satisfy the constraints of the CSP. The sets of reasons indicating assignments that do not work are commonly referred to as sets of "nogoods". When a process of this class fails to provide a set of workable assignments, one can be sure that no workable set of assignments exists. Numerous such systematic processes are known, for instance as described in M. L. Ginsberg, *Dynamic Backtracking*, JOURNAL OF ARTIFICIAL INTELLIGENCE RESEARCH 1:25–46, 1993.

The second class is known as "nonsystematic" and is typically faster to find a solution. However, because processes of this class do not keep track of whether they have considered all possible sets of element-attribute pairings, where such processes do not yield a solution, one cannot know whether a workable set of assignments exists but has not been found, or whether no workable set of assignments exists. A well-known example of such a nonsystematic technique is the GSAT technique, now known under an improved version as WSAT and described in B. Selman, et al., *Local Search Strategies for Satisfiability Testing*, PROCEEDINGS 1993 DIMACS WORKSHOP ON MAXIMUM CLIQUE, GRAPH COLORING, AND SATISFIABILITY, 1993.

Several other known strategies within these two broad classes of processes have been employed to solve CSPs.

One known process is to simply apply a heuristic, or "rule of thumb," and to see whether the heuristic results in an acceptable solution. One such heuristic might be: If machine A is available, use it; otherwise if machine B is available use it; otherwise if machine C is available use it; otherwise wait for machine A to finish and then use it. In some instances, such a technique works very well and provides a simple solution. When the heuristic fails, however, alternate techniques must be used.

One possible alternate scheme, known as iterative sampling, or isamp, involves following random paths, or probes, from a starting point until eventually a path leading to an acceptable solution is discovered. At each node on a path, one of the successor nodes is selected at random and followed; next, one of the successors to that node is selected, and so on, until either a "goal node", i.e., acceptable solution, or a dead end is reached. If a path terminates at a dead end, a new probe is begun from the original starting point.

This process samples with replacement, resulting in a uniform chance of finding a goal node on any particular probe. Accordingly, the probability of achieving a goal node progresses uniformly to 1 as the number of probes grows without limit.

Iterative sampling works well in applications exhibiting high solution densities, but not otherwise.

Another scheme, known as "backtracking," uses the heuristic approach as far as possible. When the heuristic is found to fail, the last decision before the failure is changed, unless all possible changes at that point have already been tried. If they have, the decision prior to that is changed, and so on. This process works well where heuristics early in the process are more reliable than those later in the process, because it does not revisit the earliest decisions until all of the subsequent paths have been found to fail. Unfortunately, in most real-world problems, heuristics generally become more reliable as a solution is approached and the problem is reduced in size.

Known processes for handling CSPs are all lacking in one way or another, particularly when applied to job scheduling problems. Known systematic approaches are computationally quite slow. Known nonsystematic approaches are unable to report with certainty the absence of a workable set of assignments. Furthermore, techniques such as GSAT perform very poorly in situations where there is no way to tell when one is "close" to a workable set of assignments. An example of a situation to which GSAT is not well suited is the CSP of generating a crossword puzzle by filling words from a fixed dictionary into a given frame, i.e., assigning letter attributes to square elements. GSAT falters here because a conflict at a single square may require reassignment of a large portion of the other words in the puzzle.

None of the known teachings provides an adequately robust process that does not suffer from these failings.

It would be helpful if a process and corresponding system could effectively combine systematic and non-systematic approaches to efficiently reach solutions to CSPs such as resource allocation and scheduling problems.

SUMMARY OF THE INVENTION

In accordance with the present invention, assignment of attributes to elements subject to constraints is achieved using a system (100) that has a systematic engine (120) and a nonsystematic engine (130). The systematic engine (120) includes a schedule developer (121) for producing partial proposed assignments, a pruning processor (122) for determining violations of discrepancy limits by a partial proposed assignment, and a bound selector (123) for relaxing discrepancy limits as needed. The non-systematic engine (130) includes a schedule packer (131) for modifying assignments proposed by the systematic engine and an evaluator (132) for comparing the modified assignments with the constraints.

Also in accordance with the present invention, a process of assigning attributes to elements includes iteratively generating a partial proposed assignment, determining whether it violates a predetermined discrepancy limit, and modifying the proposed assignment. If no partial proposed assignment can be constructed within the discrepancy limit, the limit is altered. A complete, but intermediate, assignment is then formed based on the proposed assignment, is improved by the non-systematic engine, and is evaluated with respect to the constraints. If the constraints are satisfied, the assignment is considered to be acceptable; otherwise, the process begins again with a new partial proposed assignment.

Still further in accordance with the invention, the schedule packer right-justifies and left-justifies a proposed assignment to improve the assignment.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF THE PREFERRED EMBODIMENTS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 3:
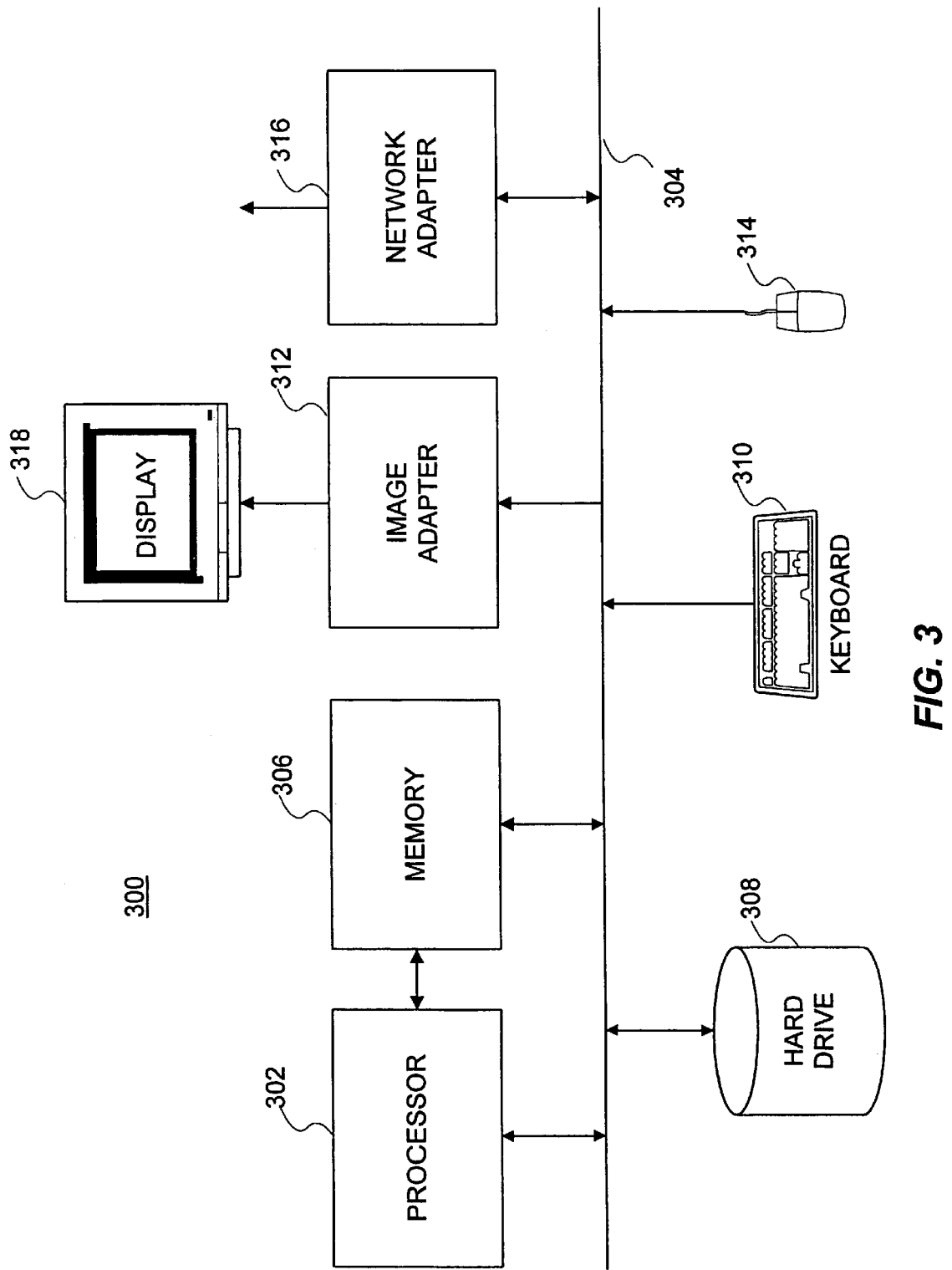
FIG. 3 is a high-level block diagram illustrating a computer system for performing an embodiment of the present invention.

FIG. 3 is a high-level block diagram illustrating a computer system 300 for producing schedules for a project in response to applied inputs concerning tasks to be performed and resources available to perform the tasks according to one embodiment of the present invention. Illustrated are at least one processor 302 coupled to a bus 304. Also coupled to the bus 304 are a memory 306, a storage device 308, a keyboard 310, a graphics adapter 312, a pointing device 314, and a network adapter 316. A display 318 is coupled to the graphics adapter 312.

The at least one processor 302 may be any general or specific purpose processor such as an INTEL 3 86 compatible central processing unit (CPU). The storage device 308 may be any device capable of holding large amounts of data, like a hard drive, compact disk read-only memory (CD-ROM), digital versatile disk (DVD), or some form of removable storage device. The memory 306 holds instructions and data used by the processor 302. The pointing device 314 may be a mouse, track ball, light pen, touch-sensitive display, or other type of pointing device and is used in combination with the keyboard 310 to input data into the computer system 300. The graphics adapter 312 displays images and other information on the display 318. The network adapter 316 couples the computer system 300 to a local or wide area network (not shown).

A program for performing scheduling according to one embodiment of the present invention is preferably stored on the storage device 308, loaded from memory 306, and executed on the processor 302. Alternatively, hardware or software modules may be stored elsewhere within the computer system 300 for performing scheduling as described herein.

Figure 1:
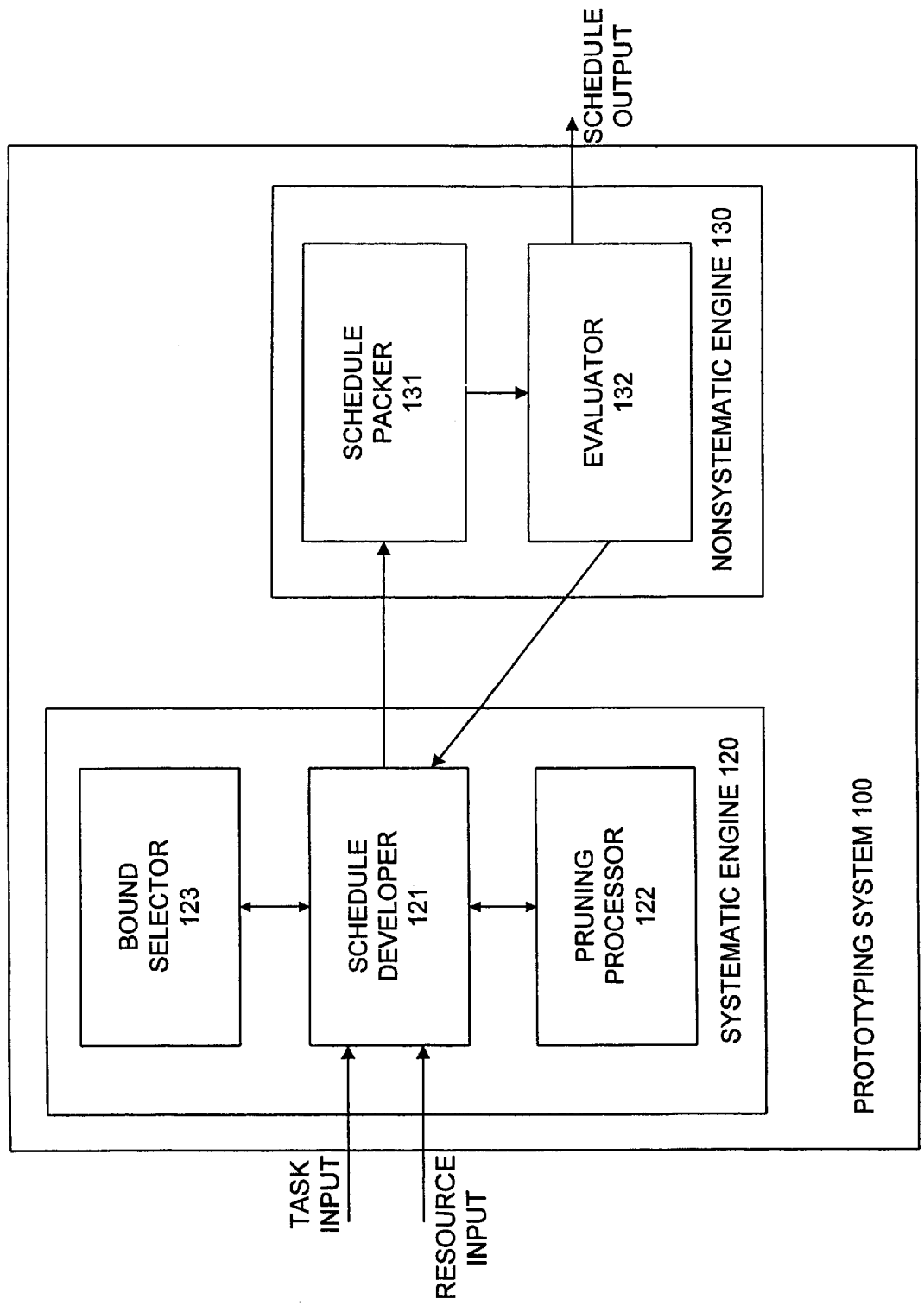
FIG. 1 is a functional block diagram of a job scheduling system in accordance with the present invention.

Referring now to FIG. 1, there is shown a system 100 for producing schedules for a project in response to applied inputs concerning tasks to be performed and resources available to perform such tasks, in accordance with the present invention. System 100 is particularly adapted to produce prototyping schedules based on known job components, or tasks, given known finite limitations on available machines, or resources. As described above, system 100 may be hardware or software executing on a computer system 300.

Figure 2:
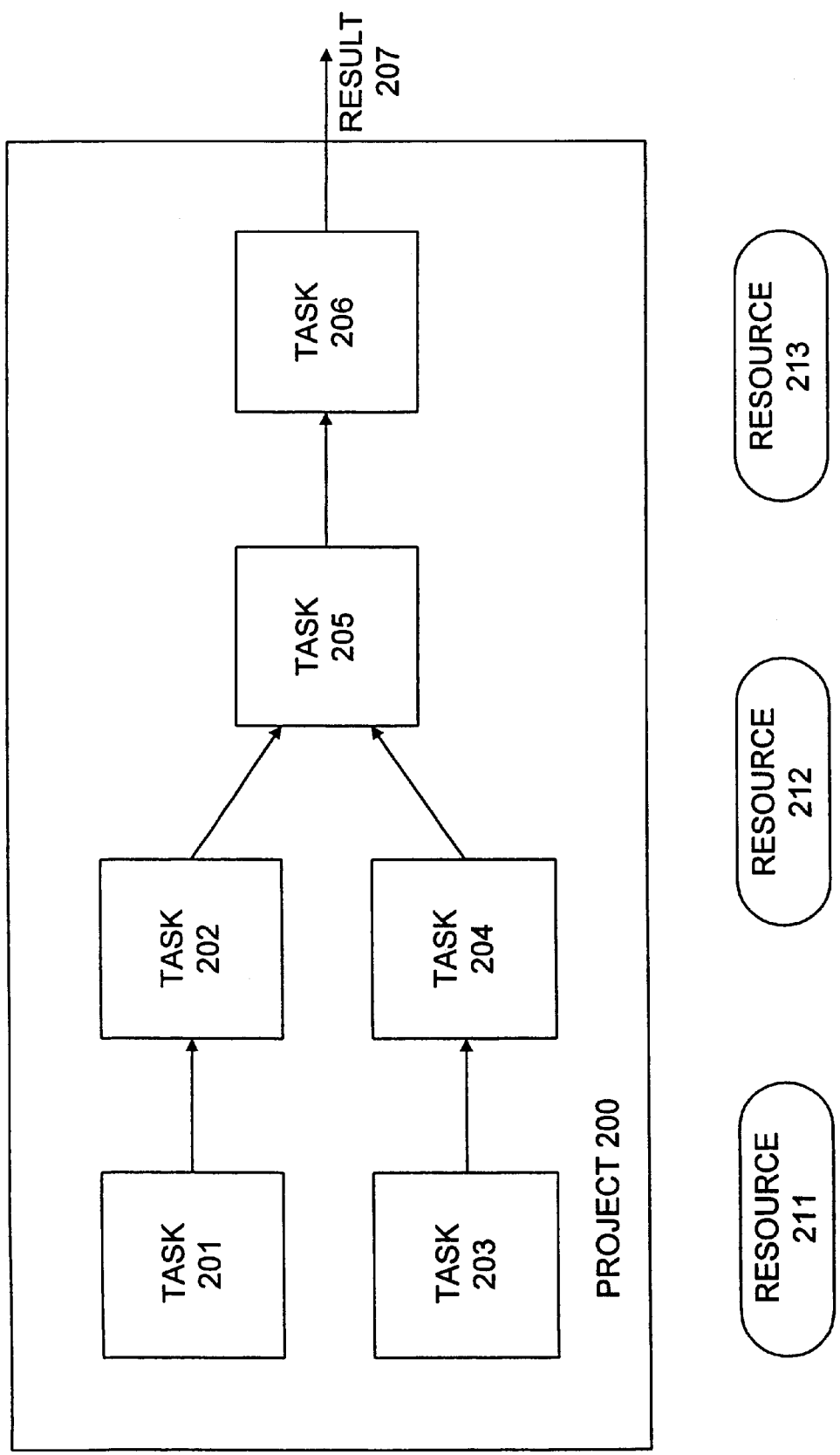
FIG. 2 illustrates a workflow capable of scheduling using the apparatus of FIG. 1, in accordance with the present invention.

Referring now also to FIG. 2, there is shown an example of a CSP of a type for which system 100 can produce a schedule. Specifically, a project 200 is made up of a number of ordered tasks 201–206. Some tasks maybe performed simultaneously, e.g., 201, 203. Other tasks must be performed sequentially, e.g., 202, 205. Various resources 211–213 are available to perform the tasks, not all of which may be suitable for any given task. Thus, in order to obtain a result 207, resources 211–213 must be allocated among the requisite tasks 201–206.

As a specific example, project 200 may involve the production of a prototype manufactured product. Step 201 may be electrical design, step 202 may be electrical development, step 203 may be mechanical design, step 204 may be mechanical development, step 205 may be electromechanical integration, and step 206 may be manufacturing. Resource 211 might be a first engineer, resource 212 might be a second engineer, and resource 213 might be a laborer. Either engineer may be capable of performing tasks 201–205, and only laborer 213 might be capable of performing task 206. Given the known relative efficiencies of the first and second engineers, and the estimated complexity of tasks 201–206, system 100 maybe called upon to find an assignment that provides a result 207 for project 200 within a desired number of weeks.

In applications where a search heuristic provides generally good results (e.g., apply the most efficient engineer to the more complex of two parallel tasks), one might expect that if faithfully following the heuristic does not result in an acceptable solution, then the heuristic probably would have led to a solution but for a small number of wrong decisions. Therefore, if a heuristic fails to provide an acceptable solution, it may make sense to systematically follow the heuristic at all but one decision point. If that process fails, the heuristic may be followed at all but two decision points, and so on. If the number of "wrong turns" caused by the heuristic is small, such a process will find an acceptable solution fairly quickly.

The term "discrepancy" is used herein to denote decision points at which the normal heuristics are ignored. The term "limited discrepancy search" is used herein to denote a process of iteratively searching for a solution that differs from what heuristics would suggest in some limited way. In a first iteration, the heuristic alone is applied. In a second iteration, the heuristic is applied but allowance is made for one discrepancy, and so on. This process is represented in pseudocode as follows: LDS-PROBE if Goal-P(node) return node
    s<-Successors(node)
    if Null-P(s) return NIL
    if k=0 return LDS-PROBE(First(s),0)
    else
    result <- LDS-PROBE(Second(s),k-1)
    if result NIL return result
    return LDS-PROBE(First(s),k)
    LDS(node)
    for x<-0 to maximum depth
    result <-LDS-PROBE(node, x)
    if result NIL return result
    return NIL In the process described by this pseudocode, x is the discrepancy limit. LDS-PROBE is iteratively called, increasing x each time. LDS-PROBE traverses the possible solution space in a depth-first manner, limiting the number of discrepancies to x. When eventually x reaches d, the depth of the possible solution space, LDS-PROBE searches the possible solution space exhaustively. Accordingly, the process is guaranteed to find an acceptable solution if one exists and is guaranteed to terminate eventually if no solution exists.

Briefly, system 100 performs generally in accordance with the above process by using two primary subsystems: systematic engine 120 and nonsystematic engine 130. Systematic engine 120 is used to ensure that, as the search for an acceptable assignment of resources to tasks proceeds, eventually every possible assignment will be considered, i.e., either tried or eliminated, until an acceptable assignment is found or it is determined that there is no acceptable solution. Nonsystematic engine 130 is used to improve the candidate solutions provided by systematic engine 120 in order to reduce the average time needed to produce an acceptable assignment using a purely systematic approach. By combining systematic engine 120 with non-systematic engine 130, it is found that average search time for an acceptable assignment is reduced over that which results from a purely systematic approach, while the primary benefit of a systematic approach, i.e., being certain that every possible assignment will eventually be considered, is retained.

Nonsystematic engine 130 includes two subsystems: a schedule packer 131 and an evaluator 132. Schedule packer 131 accepts as input the proposed assignment produced by the systematic engine 120 and produces therefrom a modified assignment that may correspond to a more efficient utilization of available resources. In a preferred embodiment, schedule packer 131 operates by first right-justifying all tasks against an arbitrary far-future deadline and then left justifying all tasks to begin as early as possible. More specifically, right-justification involves selecting a date for completion of all tasks that is sufficiently far in the future that the start date for each task follows the ending time of the current, ie., input, schedule. Left-justification then involves moving the start dates for each task to the earliest possible date, proceeding in the order that such tasks begin when right-justified. It is found that this right-justification followed by left-justification frequently provides an improved assignment in that the overall time to complete all tasks is reduced.

In one embodiment, schedule packer 131 repeats the right-justification/left-justification operation a number of times, and the best resulting schedule is used.

In scheduling activities involving multiple shifts that have differing resource availabilities, such as is the case if a night shift has fewer workers available than a day shift, it is found that where the time for completion of all tasks falls within the daily cycle of shifts can impact the results that are possible. To account for this, in one embodiment schedule packer 131 randomly chooses where the time for completion of all tasks falls within the daily cycle of shifts. Particularly where right-justification/left-justification is iterated as described below, such random placement is found to be advantageous. In another embodiment, the time for completion of all tasks is set to fall at the same point in the daily cycle as the ending time of the current, ie., input, schedule. The relative coincidence of these events has been found to yield advantageous results. For example, if the input schedule ends one hour after midnight, the time for completion for right-justification is also chosen to be one hour after midnight, albeit at some data sufficiently far in the future that the entire right-shifted schedule will not intersect the input schedule.

Evaluator 132 accepts as input the assignment produced by schedule packer 131 and estimates the overall resource utilization of the corresponding schedule. If the resource utilization is satisfactory, ie., does not violate any predetermined constraints, the resulting schedule is returned as the output of system 100. If the resource utilization is unsatisfactory, a signal is generated by evaluator 132 and sent to schedule packer 131 requesting that another schedule be proposed. In an alternate embodiment, the signal generated by evaluator 132 is sent to systematic engine 120 rather than schedule packer 131, and directs systematic engine to generate another partial proposed solution, or "seed."

Systematic engine 120 includes three major subsystems: a schedule developer 121, a pruning processor 122, and a bound selector 123. Schedule developer 121 accepts as input data concerning the required tasks and the available resources for those tasks, together with bounding data provided by bound selector 123 corresponding to discrepancy limits. Schedule developer 121 then assigns attributes to elements in an attempt to develop a schedule meeting the discrepancy limits that have been provided. As schedule developer 121 assigns attributes, they are passed, along with the discrepancy limits, to pruning processor 122. Pruning processor 122 then makes a determination as to whether the current partial assignment results in a violation of any of the discrepancy limits. If so, pruning processor 122 directs schedule developer 121 to modify the assignments to try another possibility. Schedule developer 121 keeps a record of each partial assignment that has been considered, thus ensuring that only unconsidered proposals are produced and that eventually all possibilities will have been attempted. If pruning processor 122 does not determine that any of the discrepancy limits have been violated, it sends a signal to schedule developer 121 directing schedule developer 121 to make further assignments of attributes to elements.

This process continues until either a satisfactory assignment of all attributes to all elements is obtained, or it is demonstrated that no such acceptable assignment exists. In the former case, the satisfactory assignment is passed non-systematic engine 130 for optimization. In the latter case, schedule developer 121 generates an error signal that is applied to bound selector 123, which in turn produces, if possible, weaker bounds on the allowable discrepancies that may still be usable, and the above process repeats using the weaker bounds.

In a preferred embodiment, schedule developer 121 uses a conventional depth-first search engine to ensure that all possible assignments of attributes to elements are eventually considered.

Pruning processor 122 operates by accumulating costs associated with each individual assignment of an attribute to an element and determining whether the total cost exceeds a limiting threshold provided by bound selector 123. For example, the cost associated to an assignment might be zero if the corresponding task is scheduled at the earliest available time and one if the task is scheduled at a later time. Bound selector 123 initially provides bounding data corresponding to a cost limit of zero, and gradually weakens the bounding data until the cost limit is so high that pruning processor 122 never determines that the bounding data have been violated.

It should be readily apparent from the description provided herein how systems for the assignment of attributes to elements in other CSPs may similarly be constructed.

It should also be recognized that variations and extensions of system 100 may be effectively employed in situations involving CSPs. For example, simply revising the order in which parallel tasks-resource assignments are made may lead to an acceptable solution. For example, after a given level of unsuccessful searching in which the first task calling for a machine of type A is assigned machine A1 if it is available, a second attempt is made wherein the first task calling for a machine of type A is assigned machine A2. In still another embodiment, random assignments within allowable classes are made.

As yet another alternative, different heuristics can be used to drive system 100. For instance, if an acceptable assignment using a given heuristic is not achieved with a discrepancy level of two, rather than moving to a discrepancy level of three, the search can be re-started with a different heuristic.

In practice, it is found that the particular combination of processes that provides the best results varies significantly depending on the precise nature of the problem to be solved.

In many conventional scheduling problems requiring assignment of resources to tasks, such as that illustrated and discussed above in connection with FIG. 2, it is found that system 100 as described herein provides good results without being combined with any other process.

Therefore, determination of a schedule calling for assignment of resources to tasks is achieved by using a systematic engine having a schedule developer, a pruning processor, and a bound selector; and a non-systematic engine having a schedule packer and an evaluator.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

We claim:

1. A computer-implemented process for producing a schedule for a project by assigning attributes to elements, subject to a set of constraints, the process comprising:
   a) generating a partial proposed assignment;
   b) determining whether the partial proposed assignment violates a first subset of the constraints;
   c) modifying the partial proposed assignment responsive to violation of the first subset of the constraints;
   d) iterating b) and c) responsive to continued violation of the first subset of the constraints;
   e) forming an intermediate assignment responsive to the partial proposed assignment;
   f) modifying the intermediate assignment to produce an improvement of the intermediate assignment;
   g) evaluating the improvement with respect to the constraints;
   h) iterating a)–g) responsive to the improvement violating a second subset of the constraints; and
   i) producing the schedule for the project from the improvement responsive to the improvement not violating the constraints.

2. A computer-implemented process as in claim 1, wherein the generating a partial proposed assignment includes following a heuristic.

3. A computer-implemented process as in claim 1, wherein the constraints include a required deadline for completion of the project.

4. A computer-inplemented process for producing a schedule for a project by assigning attributes to elements, subject to a set of constraints, the process comprising:
   a) generating a partial proposed assignment;
   b) determining whether the partial proposed assignment violates a predetermined discrepancy limit;
   c) modifying the partial proposed assignment responsive to violation of the predetermined discrepancy limit;
   d) iterating b) and c) responsive to continued violation of the predetermined discrepancy limit and responsive to existence of additional possible proposed assignments for which violation of the predetermined discrepancy limit is not established;
   e) altering the predetermined discrepancy limit and iterating a)–d) responsive to the non-existence of additional possible proposed assignments for which violation of the predetermined discrepancy limit is not established; and
   f) producing the schedule for the project based upon the partial proposed assignment.

5. A computer-implemented process as in claim 4, wherein the generating a partial proposed assignment includes following a heuristic.

6. A computer-implemented process as in claim 4, wherein the discrepancy limits include a threshold number of violations of a predetermined heuristic.

7. A computer-implemented process as in claim 4, wherein the constraints include a required deadline for completion of the project.

8. A computer-implemented system for producing a schedule for a project by assigning attributes to elements in accordance with given constraints, the system comprising:

a systematic engine including:

a schedule developer adapted to generate an intermediate assignment of a subset of the attributes to a subset of the elements;

a pruning processor operatively coupled to the schedule developer and adapted to generate an error signal responsive to violation of a first subset of the given constraints, the error signal being applied to the schedule developer and causing the schedule developer to modify the intermediate assignment; and a nonsystematic engine, including:

a modification module operatively coupled to the systematic engine, adapted to accept as input the intermediate assignment and to produce therefrom an improvement thereof; and an evaluator, operatively coupled to the modification module, adapted to estimate an overall resource utilization of the improvement, to generate as output a violation signal in response to the improvement violating a second subset of the constraints, the violation signal being applied as an input to the systematic engine and causing the schedule developer to generate a new intermediate assignment, and to generate as output the improvement as the schedule for the project.

9. A computer-implemented system as in claim 8, wherein the schedule developer and the pruning processor iteratively operate together to generate partial assignments, and wherein each iteration of intermediate assignment generation results in addition of a new assignment of one of the attributes of one of the elements, in response to a previous iteration not resulting in generation of the error signal.

10. A computer-implemented system as in claim 8, wherein the constraints include a required deadline for completion of the project.

\* \* \* \* \*